United States Patent [19]

Kamaya

[11] Patent Number: 4,735,350
[45] Date of Patent: Apr. 5, 1988

[54] ROOF CARRIER STRUCTURE FOR A VEHICULAR AUTOMOBILE AND A LOCK THEREFOR

[75] Inventor: Masashi Kamaya, Tokyo, Japan

[73] Assignee: PIAA Corporation, Tokyo, Japan

[21] Appl. No.: 876,430

[22] Filed: Jun. 20, 1986

[51] Int. Cl.$^4$ ............................................. B60R 9/00
[52] U.S. Cl. ................................. 224/315; 224/323; 224/331
[58] Field of Search ............ 224/309, 315, 322, 323, 224/324, 329

[56] References Cited

U.S. PATENT DOCUMENTS

| | | | |
|---|---|---|---|
| 10,660 | 3/1854 | Goffin | 70/DIG. 27 X |
| 3,638,844 | 2/1972 | Bronson | 224/323 X |
| 3,719,297 | 3/1973 | Nowicki | 224/315 X |
| 3,726,410 | 4/1973 | Binding et al. | 224/315 X |
| 3,848,785 | 11/1974 | Bott | 224/323 X |
| 4,312,467 | 1/1982 | Kulwin | 224/315 |
| 4,326,654 | 4/1982 | Frey | 224/315 |
| 4,326,655 | 4/1982 | Gradek et al. | 224/917 X |
| 4,469,260 | 9/1984 | Delahanty | 224/917 X |
| 4,516,709 | 5/1985 | Bott | 224/315 |

FOREIGN PATENT DOCUMENTS

| | | | |
|---|---|---|---|
| 1256103 | 12/1967 | Fed. Rep. of Germany | 70/258 |
| 153865 | 2/1982 | Fed. Rep. of Germany | 224/315 |

Primary Examiner—Henry J. Recla
Assistant Examiner—Robert M. Petrik
Attorney, Agent, or Firm—Oblon, Fisher, Spivak, McClelland & Maier

[57] ABSTRACT

A lock unit for a roof carrier having a crossbar for securely placing a carried object hereon, and a plurality of stands for placing the crossbar on a vehicle roof, including a pivotal cover rod having a first end for supporting the carried object sandwiched between the pivotal rod and the crossbar and which is pivotally supported on a first side end of the crossbar and a hook-like bent portion is provided at a second end of the pivotal cover rod, a lock member provided at a second side end of the crossbar.

2 Claims, 3 Drawing Sheets

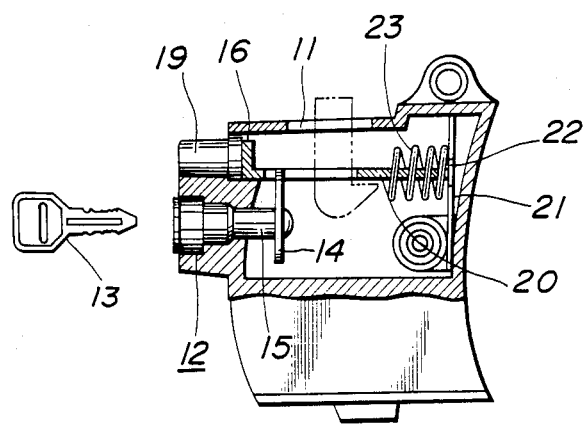

ROOF CARRIER STRUCTURE FOR A VEHICULAR AUTOMOBILE AND A LOCK THEREFOR

BACKGROUND OF THE INVENTION

1. Field of the Invention

The present invention relates to a roof carrier for a vehicle and, more particularly, to a roof carrier structure for securely supporting and fixing an object to be carried and for preventing theft of the roof carrier.

2. Description of the Prior Art

Along with the trends of motorization, a roof carrier has become an indispensable accessory for a vehicle. Esthetic roof carriers are popular, and tend to be expensive. A roof carrier of this type must have a structure to prevent a carried object from becoming detached and causing an accident, even if a strong vibration acts thereon. Furthermore, the carried object must be easily mounted/dismounted while at the same time preventing it from being stolen.

SUMMARY OF THE INVENTION

The present invention provides a roof carrier which satisfies the above requirements, and a lock unit therefor.

In a roof carrier comprising a crossbar for securely placing a carried object thereon and a plurality of stands for placing the crossbar on the roof of a vehicle, one end of a pivotal rod for supporting the carried object sandwiched between the pivotal rod and the crossbar is pivotally supported on one side end portion of the crossbar. Therefore, the carried object will not be detached by the vibration of the vehicle. In addition, the carried object can be easily mounted/dismounted from the roof carrier simply by pivoting the pivotal rod.

A hook-like bent portion is provided at the other end of the pivotal rod, and is held by a lock member provided at the other side end portion of the crossbar. Therefore, the pivotal rod will not be pivoted undesirably by the vibration of the vehicle.

Furthermore, the lock member is provided as previously stated, and the pivotal member is held thereby, so that only a person with an unlocking member, i.e., a key, to the lock member can pivot the pivotal rod, thereby preventing theft of the carried object, e.g., a pair of skis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3 and 4 show a lock member and a mounting state thereof, respectively, in which FIG. 3 is a partial sectional view of the overall configuration of the lock member, and FIG. 4 is an exploded view of the same; and FIG. 5 is a partial sectional view of a lock and a mounting state thereof according to another embodiment of the present invention.

DESCRIPTION OF THE PREFERRED EMBODIMENT

An embodiment of the present invention will now be described with reference to the accompanying drawings.

Upper ends of a pair of stands 2 are mounted on two side ends of a crossbar 1. The lower ends of the stands 2 are engaged and fixed by gutter portions provided on two sides of a vehicle (not shown). Usually, a plurality of carrier main bodies 3 are mounted on the vehicle roof along a longitudinal direction thereof.

Figure 3:
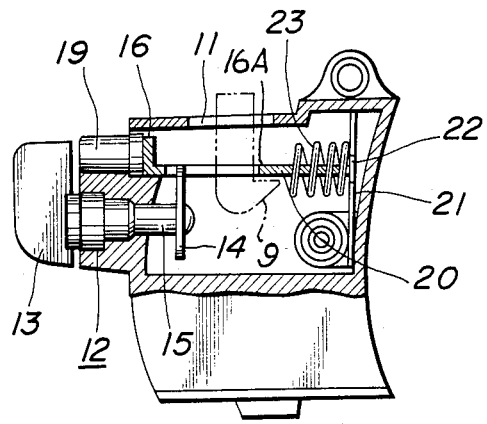
Figure 4:
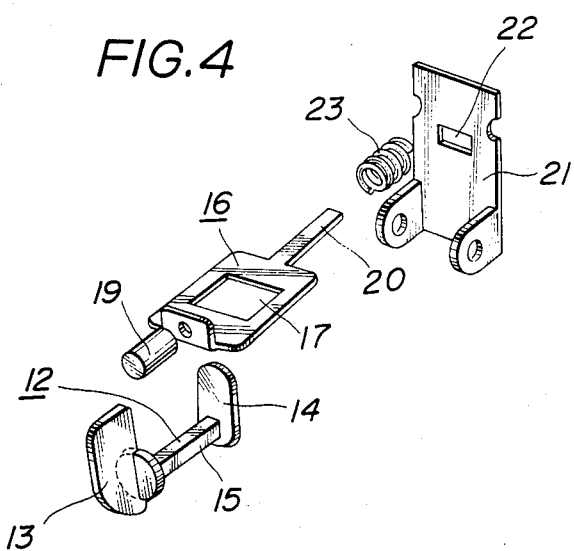

A plurality of support members 4 engage with the crossbar 1 to be laterally movable. The support members 4 are generally made of a flexible material such as synthetic rubber. A recess is formed in the upper surface of each support member 4 so that a carried object 5, such as a ski, can be engaged with and supported thereby. A pair of lock or fixing members 6,6' are supported on the two side ends of the crossbar 1. A support strap 7 extends between the fixing members 6,6' above the upper surface of the support members 4, with the two ends thereof fixed to the fixing members 6,6'. A cover rod 8 is arranged above the crossbar 1 and the support strap 7. One end of the cover rod 8 is pivotally supported to one fixing member 6,6' and the other end thereof constitutes a hook-like member 9. The other fixing member 6 is hollow, has a hole 11 in the upper surface thereof for allowing the hook-like member 9 of the cover rod 8 to be inserted into and removed therefrom, and incorporates a lock mechanism 10. A lock 12 of the mechanism 10 is mounted on the wall of the fixing member 6, as shown in FIGS. 3 and 4. The lock 12 can be of any conventional type. It is preferable that the lock 12 have a pivotal knob 13 on the outer side of the wall, that an intermediate shaft portion 15 having a lock piece 14 extending in one direction in a hollow space within the member 6 is supported by the wall, and that the lock piece 14 is interlocked with the pivotal movement of the knob 13. A conventional stationary lock can be provided in the lock 12 to prevent its pivotal movement.

A horizontal rod 16 slides to the right and left in the hollow space. The hook-like member 9 of the cover rod 8 can be engaged with the intermediate portion of the horizontal rod 16, and has a lock hole 17. One end edge of the hole 17 can be engaged with the hook-like member 9, and the other end edge thereof can be engaged with the lock piece 14 of the lock 12. The outer end of the rod 16 extends through a through hole 18 in the wall. A press button 19 projecting from the fixing member 6 is fixed to the outer end of the rod 16. The inner end of the rod 16 extends along its axis, and has a guide rod 20 fixed thereon. When the knob 13 is pivoted to engage the lock piece 14 with the lock hole 17, the press button 19 is preferably at a position such that its head is located inside the knob 13. A vertical flat plate 21 is fixed to one side of the hollow space of the fixing member 6. The vertical flat plate 21 is preferably pivotal only to the left (the direction toward the lock 12) in the drawing, in order to allow a smooth sliding movement of the horizontal rod 16, to be described later. A small hole 22 is formed at substantially the central portion of the flat plate 21. The guide rod 20 of the horizontal rod 16 extends through the small hole 22. A coil spring 23 wound around the guide rod 20 is inserted between the flat plate 21 and the edge of the lock hole 17 of the horizontal rod 16.

A projection 24 projects downward from substantially the central portion of the lower surface of the cover rod 8. The projection 24 engages with the strap 7 in order to pull it downward.

Figure 1:
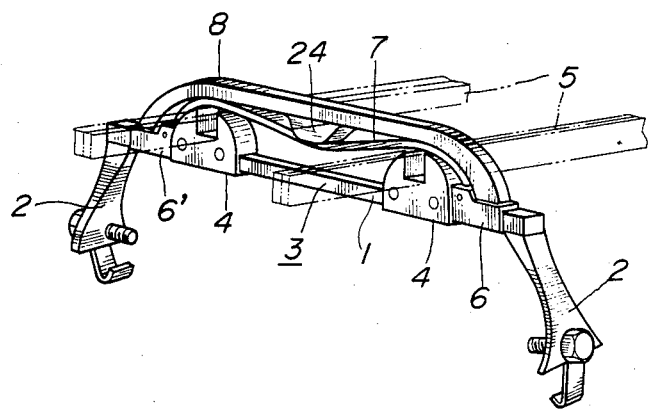
FIG. 1 is a perspective view showing the entire configuration of a roof carrier according to the present invention.
Figure 2:
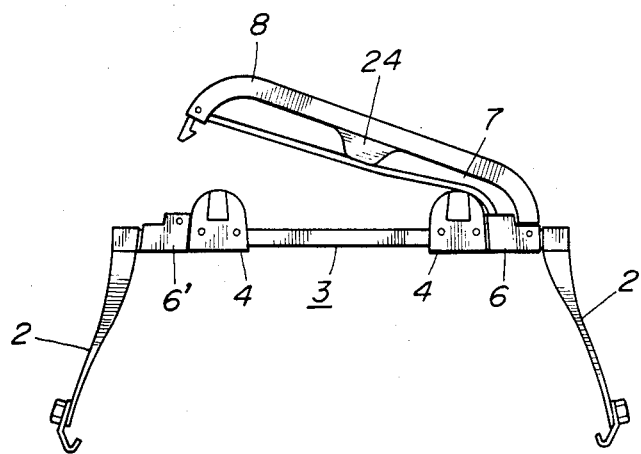
FIG. 2 is a front view of the same.

Operation of the present invention will now be described. The cover rod 8 is opened as indicated by an alternate long and two short dashed lines in FIG. 2. The carried object 5, such as a ski, is passed under the support strap 7 and is engaged in the recess of the support member 4 of the crossbar 1. Subsequently, the cover rod 8 is pivoted to close it. In this case, the projection 24 of the cover rod 8 presses against substantially the intermediate portion of the strap 7. Therefore, the carried object 5 is, securely pressed by the strap 7 and thus will not become detached from the support member even if the vehicle vibrates. In addition, the hook-like member 9 at one end of the cover rod 8 passes through the hole 11 formed in the upper surface of one fixing member 6, and is engaged with the inner edge of the hole 17 in the horizontal rod 16, against the biasing force of the spring 23. In this state, the lock piece 14 of the lock 12 is engaged with the outer end edge of the hole 17. The knob 13 does not contact the head of the button 19 of the horizontal rod 16 since the knob 13 is located inside the head of the button 19. Therefore, the cover rod 8 is not disengaged from the horizontal rod 16. The carried object 5 is carried in this state.

Assuming that the carried object 5 is to be removed from the roof carrier main body 3, in such case, the knob 13 of the lock 12 is rotated so that the lock member 14 is moved through the intermediate shaft portion 15 of the lock 12. The lock piece 14 is thus disengaged from the hole 17 of the horizontal rod 16. Simultaneously, the head of the button 19 is exposed. The head of the button 19 can then be pressed against the biasing force of the spring 23. Since the guide rod 20 of the horizontal rod 16 is fitted in the small hole 22 in the flat plate 21, the horizontal rod 16 is guided by the small hole 22 and is laterally moved upon pressing the button 19. As a result, the hook-like member 9 of the cover rod 8 is disengaged form the hole 17 of the horizontal rod 16. Next, the cover rod 8 is moved upward to open it so that the carried object 5 can be easily removed.

FIG. 5 shows an arrangement wherein the knob 13 described above is modified so to be a key so that it is removable. For locking operation, the key is inserted in the keyhole of the lock and thereafter can normally be carried by the user.

As described above, according to the present invention, a carried object, such as a pair of skis, can be easily mounted on or dismounted from a roof carrier of a simple structure. Even if the vehicle undergoes seven vibration, the carried object will not be detached. In addition, the carried object can be prevented from being stolen.

What is claimed is:

1. A lock unit for a roof carrier, comprising:
    a crossbar for securely placing a carried object thereon;
    a plurality of stands for placing said crossbar on a vehicle roof;
    a fixing member mounted on said crossbar;
    a pivotal cover rod having a first end for supporting the carried object sandwiched between said pivotal rod and said crossbar and which is pivotally supported on a first side end of said crossbar;
    a hook-like bent portion provided at a second end of said pivotal cover rod;
    a lock member provided at a second side end of said crossbar, connected to said fixing member and having a hollow space such that said hook-like bent portion for connection to said lock member is insertable therein;
    a horizontal rod slidably positioned in said hollow space and having a lock hole formed therein into which said hook-like bent portion is inserted such that an edge portion of said horizontal rod is engageable with said hook-like portion and including a guide rod extending therefrom;
    means for axially biasing said edge portion of said horizontal rod into engagement with said hook-like bent portion and within which said guide rod extends; and
    means positioned in said hollow space for locking said horizontal rod into engagement with said hook-like bent portion.

2. A lock unit for a roof carrier as set forth in claim 1, further comprising a plate member connected to said fixing member and having a hole formed therein within which said guide rod is selectively inserted.

* * * * *